United States Patent [19]

Kearton et al.

[11] Patent Number: 4,708,844
[45] Date of Patent: Nov. 24, 1987

[54] REACTOR MONITORING ASSEMBLY

[75] Inventors: William B. Kearton, Pittsburgh; Kenneth A. Kloes, Penn Hills Township, Allegheney County; Joel R. Terry, Murrysville, all of Pa.

[73] Assignee: Westinghouse Electric Corp., Pittsburgh, Pa.

[21] Appl. No.: 591,637

[22] Filed: Mar. 20, 1984

[51] Int. Cl.[4] ............................................. G21C 17/00
[52] U.S. Cl. .................................... 376/247; 376/254; 376/258
[58] Field of Search ................ 376/245, 247, 254, 255, 376/258

[56] References Cited

U.S. PATENT DOCUMENTS

| 2,579,994 | 12/1951 | Zinn | 376/254 |
|---|---|---|---|
| 2,677,772 | 5/1954 | Moon | 376/254 |
| 3,028,494 | 4/1962 | Wickersham et al. | 376/254 |
| 3,132,077 | 5/1964 | Turovlin | 376/247 |
| 3,751,333 | 8/1973 | Drummond et al. | 376/255 |
| 3,796,156 | 10/1973 | Brecy | 376/255 |
| 3,810,138 | 5/1974 | Thompson et al. | 376/247 |
| 3,997,789 | 12/1976 | Mathieu | 250/390 |
| 4,097,330 | 6/1978 | Neissel et al. | 376/255 |
| 4,106,983 | 8/1978 | Meuschke et al. | 376/247 |
| 4,255,234 | 3/1981 | Neuner et al. | 376/254 |
| 4,313,793 | 2/1982 | Klumb et al. | 376/245 |
| 4,406,011 | 9/1983 | Burns | 376/247 |
| 4,425,297 | 1/1984 | Rolstad et al. | 376/247 |
| 4,449,403 | 5/1984 | McQueen | 376/247 |

FOREIGN PATENT DOCUMENTS

| 3221625 | 4/1983 | Fed. Rep. of Germany . |
| 2018421 | 10/1979 | United Kingdom . |
| 2056055 | 3/1981 | United Kingdom . |
| 1604086 | 12/1981 | United Kingdom . |

OTHER PUBLICATIONS

S 1708 0046, IEEE Trans on Nuc. Sci., vol. NS-28, No. 1(2/81), Allan et al., pp. 720-727.

Primary Examiner—Salvatore Cangialosi
Attorney, Agent, or Firm—Daniel C. Abeles

[57] ABSTRACT

A combined in-core flux detector and thermocouple assembly for a nuclear reactor composed of an outer tube which is sealed at its upper end; an inner tube disposed within, and extending along the length of, the outer tube; a neutron detector means disposed within the inner tube; an element connected to the neutron detector for displacing the neutron detector along the length of the inner tube; and a plurality of thermocouples disposed outside of the inner tube and enclosed within the outer tube.

7 Claims, 4 Drawing Figures

FIG 3
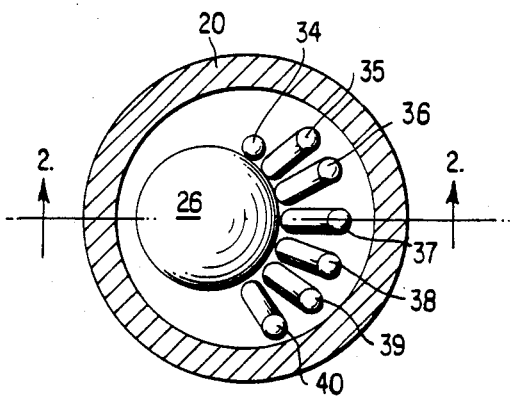
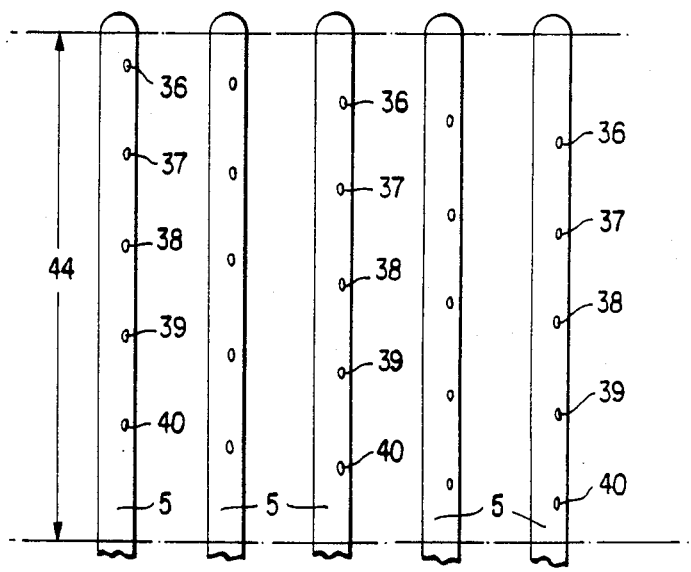
FIG. 4

# REACTOR MONITORING ASSEMBLY

BACKGROUND OF THE INVENTION

The present invention relates to assemblies for monitoring various operating parameters within a reactor core, including, in particular, the neutron flux distribution throughout the core and the core exit coolant temperature.

During the operation of a nuclear reactor, it is necessary to constantly monitor a variety of operating parameters, including the neutron flux throughout the reactor core, the core exit coolant temperature, and the coolant level within the reactor pressure vessel.

Heretofore, these operations have been performed by a variety of monitoring devices which extend through the reactor pressure vessel at various locations. Of course, each penetration of the reactor pressure vessel requires a high quality, reliable seal.

Furthermore, it is common practice to utilize thermocouples for the various monitoring operations, particularly for monitoring the core exit coolant temperature. It is known that thermocouples are prone to failure and that their replacement is a difficult and time consuming operation.

SUMMARY OF THE INVENTION

It is an object of the present invention to reduce the number of locations at which the connections for such monitoring devices must pass through the pressure vessel of such a reactor.

A further object of the invention is to reduce the frequency with which the thermocouples of such monitoring devices must be replaced.

A further object of the invention is to provide an effective backup coolant level monitoring system for such reactors.

Yet another object of the invention is to provide spare thermocouples which are installed at the same time as the primary thermocouples.

The above and other objects are achieved, according to the present invention, by the provision of a combined in-core flux detector and thermocouple assembly for a nuclear reactor comprising: an outer tube which is sealed at its upper end; an inner tube disposed within, and extending along the length of, the outer tube; neutron detector means disposed within the inner tube; means connected to the neutron detector means for displacing the neutron detector means along the length of the inner tube; and a plurality of thermocouples disposed outside of the inner tube and enclosed within the outer tube.

According to preferred embodiments of the invention, a group of the thermocouples enclosed within the outer tube are spaced apart along the length of the tubes and are electrically connected to constitute a backup coolant level monitoring system. Since the primary coolant level monitoring system utilized in many reactors is of the pressure sensitive type, a significant advantage of the present invention is that it provides a coolant level monitoring system operating according to a different principle so that any condition causing failure of one system is unlikely to simultaneously cause failure of the other system.

According to a further feature of the invention, one of the thermocouples constitutes the normally operative core exit coolant temperature sensor, while a second one of the installed thermocouples is connected to take over this function if the normally operative coolant temperature thermocouple should fail.

According to a particularly advantageous feature of this invention, all of the mechanical and electrical connections for the monitoring elements of the assembly can be brought out of the pressure vessel via a single passage which is preferably located in the vicinity of the bottom of that vessel.

BRIEF DESCRIPTION OF THE DRAWING

FIG. 3 is a cross-sectional view taken along the line 3—3 of FIG. 2.

FIG. 4 is a simplified pictorial view illustrating the distribution of level measuring thermocouples in a plurality of detector assemblies disposed in a reactor according to the invention.

DESCRIPTION OF THE PREFERRED EMBODIMENTS

Figure 1:
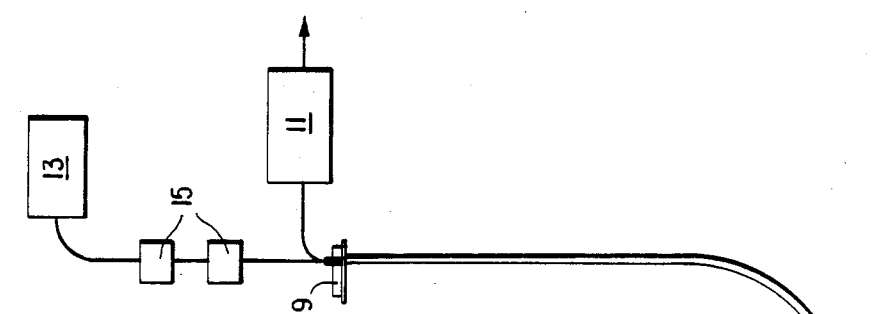
FIG. 1 is a simplified elevational view of a reactor system equipped with a detector assembly according to the invention.

The reactor system shown in FIG. 1 includes a reactor pressure vessel 1 housing a reactor core 3. The reactor and its core may be of a conventional pressurized water type, the core being provided with a plurality of fuel assemblies extending vertically therein.

One detector assembly 5 according to the invention is shown extending vertically through the core. Typically, a plurality of such detector assemblies will be provided, with each assembly being installed at the center of an associated fuel rod assembly in such a manner that detector assemblies will be distributed essentially uniformly across the horizontal cross-section of core 3.

For effecting external connections to the various components of each detector assembly, there is provided guide tubing 7 which extends from pressure vessel 1 to a conventional seal table 9 at which mechanical and electrical connections to detector assembly 5 can be effected while sealing the region outside of the seal table from the reactor pressure vessel itself.

Basically, electrical connections between the various detectors in detector assembly 5 and suitable signal processing circuitry (not shown) can be effected via a connection box 11, while the movable neutron detector within detector assembly 5 is driven via a movable detector drive unit 13 and a drive transfer system 15 connected between drive unit 13 and a flexible cable which extends through guide tubing 7 from the neutron detector to seal table 9.

For establishing the necessary electrical connections to the thermocouples within detector assembly 5, seal table 9 may be provided, for example, with a suitable multi-contact receptable such as receptable #CIR 01 KP-20-27S-TC, manufactured by Veam Division of Litton Industries. Such receptacle can mate with a plug #CIR 06 KP-20-27P-TC manufactured by the same company.

Figure 2:
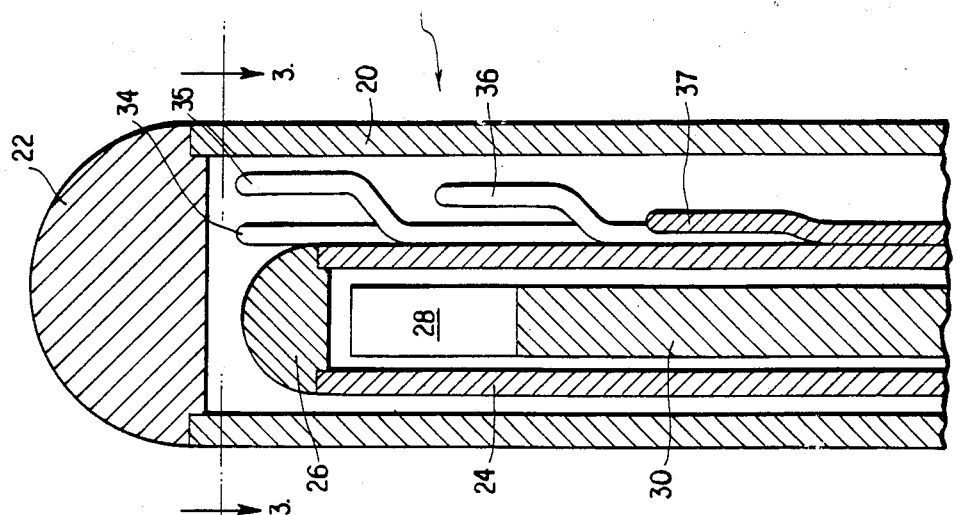
FIG. 2 is an elevational, cross-sectional view, taken along line 2—2 of FIG. 3, of a preferred embodiment of an assembly according to the invention.

FIG. 2 shows the upper portion of one preferred embodiment of a detector assembly 5 according to the invention. The illustrated assembly includes an outer, or sheath, tube 20 whose upper end is sealed by an outer tube end plug 22. Within tube 20, and extending along the length thereof, there is an inner tube 24 constituting a detector guide tube and closed at its upper end by an inner tube end plug 26.

Within tube 24, there is disposed a neutron flux detector 28 which is constructed and connected to monitor the neutron flux within the reactor core. Detector 28 is carried by, and disposed at the end of, a detector drive cable 30.

Tubes 20 and 24, as well as plugs 22 and 26 may be made, for example, of Inconel SB-166 stainless steel. Alternatively, plugs 22 and 26 may be made of SA479-T type 316 stainless steel. Plugs 22 and 26 are secured in the upper ends of tubes 20 and 24, respectively, by a suitable force fit and seal weld.

Secured to the outer surface of tube 24 is an array of thermocouple elements 34–40, only the elements 34, 35, 36 and 37 being visible in FIG. 2. These are conventional thermocouple elements enclosed in housing tubes, and the thermocouple element tubes may be secured to tube 24 in any suitable manner, such as by brazing. Thermocouple 34 constitutes the normally operative core exit temperature monitoring thermocouple, while thermocouple element 35 is provided as a backup to element 34, element 35 being connected to monitor the core exit temperature in case of failure of element 34.

Thermocouples 36–40 are spaced apart along the axis of the assembly and are provided to serve as a backup reactor coolant level monitoring system which will be used if the primary level monitoring system, which is normally of the pressure sensitive type, should fail.

In a practical embodiment of the invention, neutron flux detector 28 may be of the Westinghouse type #23957, which has an outer diameter of 0.300 cm. This size enables the entire assembly to be dimensioned for installation in a conventional fuel rod assembly. For example, the assembly, i.e. outer tube 20, can be given an outer diameter of the order of 0.800 cm with a maximum wall thickness for outer tube 20 of the order of 0.056 cm, a maximum outer diameter for inner tube 24 of the order of 0.513 cm, a maximum wall thickness for inner tube 24 of the order of 0.080 cm, and thermocouple tube maximum diameters of the order of 0.11 cm. These, of course, represent only exemplary values. Thermocouple elements 34–40 may suitably be of the chromel-alumel type.

Drive cable 30 and the electrical connections for neutron detector 28 and thermocouples 34–40 all extend downwardly from the bottom of tube 20 and then through reactor vessel 1 via guide tubing 7 to seal table 9. Therefore, electrical connections are made to the receptacle provided at the seal table, and the drive cable is coupled in a suitable manner to system 15. In operation, drive unit 13 is operated via system 15 to displace cable 30 in a manner to move detector 28 vertically in tube 24 to permit monitoring of the neutron flux at different levels within the reactor, while the reading provided by thermocouple element 34, or in the event of failure of that element by thermocouple element 35, is continuously monitored. The readings produced by thermocouple elements 36–40 can be employed only if the main coolant level monitoring system should fail.

Thus, all of the connections for the components in the detector assembly according to the invention can be brought out of the pressure vessel via a single opening in the bottom thereof, thereby greatly reducing the complexity of the reactor structure and the problems associated with sealing openings in the reactor pressure vessel.

The thermocouples 36–40 serving as the backup coolant level monitoring system are preferably spaced equidistantly over the height of core 3.

In a reactor employing detector assemblies according to the invention, all of the detector assemblies may be identical with respect to the location of thermocouple elements 36–40. Alternatively, according to a further feature of the invention, the vertical positions of these thermocouple elements can be staggered from one detector assembly to another in order to provide a more precise coolant level monitoring operation. One suitable arrangement of an array of five detector assemblies is shown in FIG. 4.

Such a group of assemblies may be disposed in respective fuel rods in proximity to one another, with similar arrays being regularly distributed over the cross section of the reactor core. The location of each thermocouple element of the illustrated array with respect to the height 44 of the associated core is depicted. The difference in height of the thermocouple elements from one detector assembly to the next adjacent one will typically be of the order of one fifth the spacing between thermocouple elements in any one detector assembly, thereby providing a uniform height coverage.

Typically, all of the backup coolant level monitoring thermocouples 36–40 may be electrically connected so that the voltage generated by each thermocouple is individually monitored. The voltage readings from the individual thermocouples may then be sequentially scanned or all printed out under control of a computer for observation by a operator. Thus, no special circuitry is required for these thermocouples.

It will be understood that the above description of the present invention is susceptible to various modifications, changes and adaptations and the same are intended to be comprehended within the meaning and range of the appended claims.

We claim:

1. In a nuclear reactor core, a plurality of combined in-core flux detector and thermocouple assemblies, each said assembly comprising: an outer tube which is sealed at its upper end; an inner tube disposed within, and extending along the length of, said outer tube; neutron detector means disposed within said inner tube; means connected to said neutron detector means for displacing said neutron detector means along the length of said inner tube; and a plurality of thermocouples disposed outside of said inner tube and enclosed within said outer tube, said plurality of thermocouples comprising one group of thermocouples which are spaced apart along the length of said outer tube, wherein said group of thermocouples of each said assembly is connected to constitute a back-up coolant level monitoring means, and said assemblies are distributed over a selected region of the reactor core, with the locations of said group of thermocouples along the length of said outer tube being different from one said assembly to another to provide a coolant level monitoring operation having a higher precision than could be achieved by one said assembly alone.

2. An arrangement as defined in claim 1 wherein in each said assembly thermocouples is provided with conductive leads and all of said conductive leads and said means connected to said neutron detector means extend out of said assembly via the lower end of said outer tube.

3. An arrangement as defined in claim 2 wherein in each said assembly outer tube is arranged to extend through the bottom of a reactor pressure vessel into the core of such reactor.

4. An arrangement as defined in claim 1 wherein said group of thermocouples of each said assembly is connected to constitute a back-up coolant level monitoring means.

5. An arrangement as defined in claim 4 wherein said plurality of thermocouples of each said assembly further comprises a first thermocouple connected to monitor the temperature of coolant exiting the reactor core and a second thermocouple connected to monitor that temperature in the event of failure of said first thermocouple.

6. An arrangement as defined in claim 1 wherein said plurality of thermocouples of each said assembly further comprises a first thermocouple connected to monitor the temperature of coolant exiting the reactor core and a second thermocouple connected to monitor that temperature in the event of failure of said first thermocouple.

7. An arrangement as defined in claim 1 in combination with a reactor including a pressure vessel and a core housed within said pressure vessel and containing a plurality of fuel rod assemblies, wherein each said flux detector and thermocouple assembly is located within a respective fuel rod assembly and is connected to the region outside of said pressure vessel via a single passage in the vicinity of the bottom of said pressure vessel.

* * * * *